No. 806,234. PATENTED DEC. 5, 1905.
P. BASTIAN.
WATER PURIFIER.
APPLICATION FILED AUG. 27, 1904.
3 SHEETS—SHEET 3.
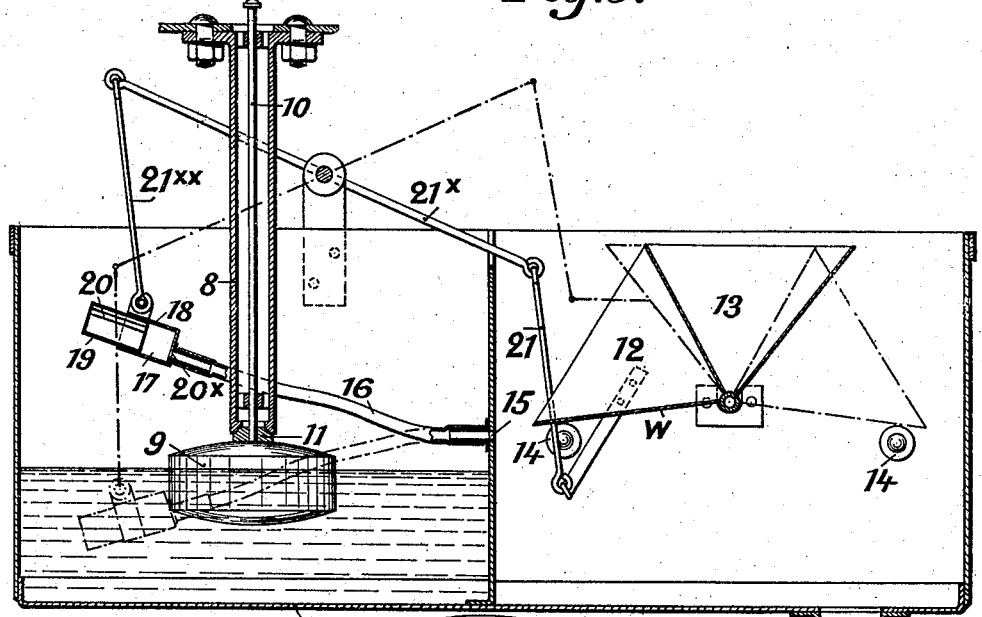
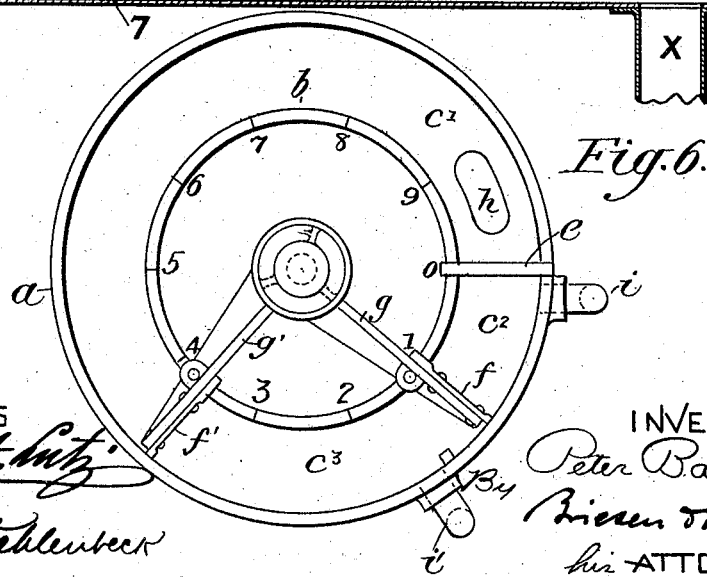
WITNESSES
INVENTOR
Peter Bastian
his ATTORNEYS

UNITED STATES PATENT OFFICE.

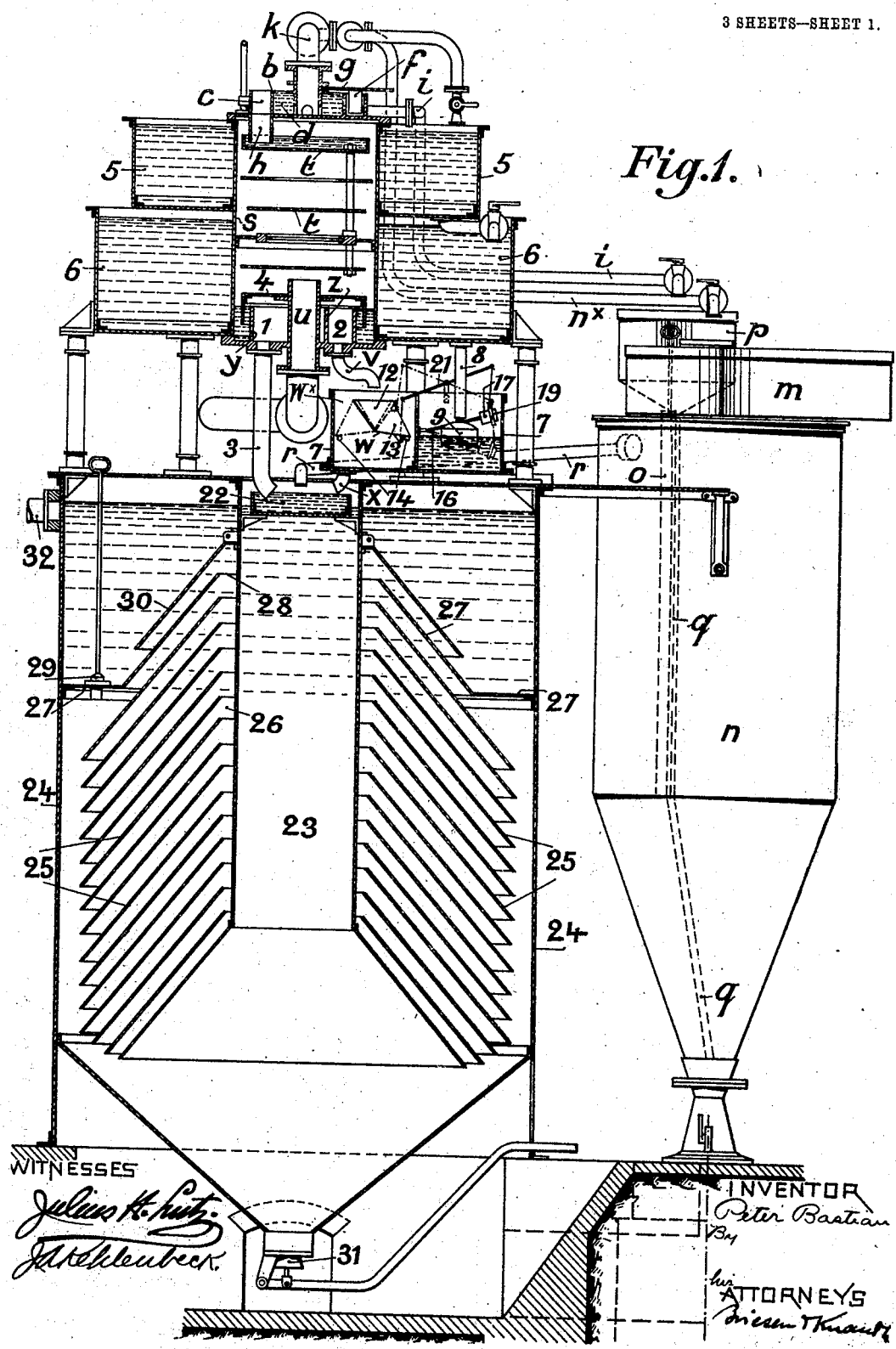

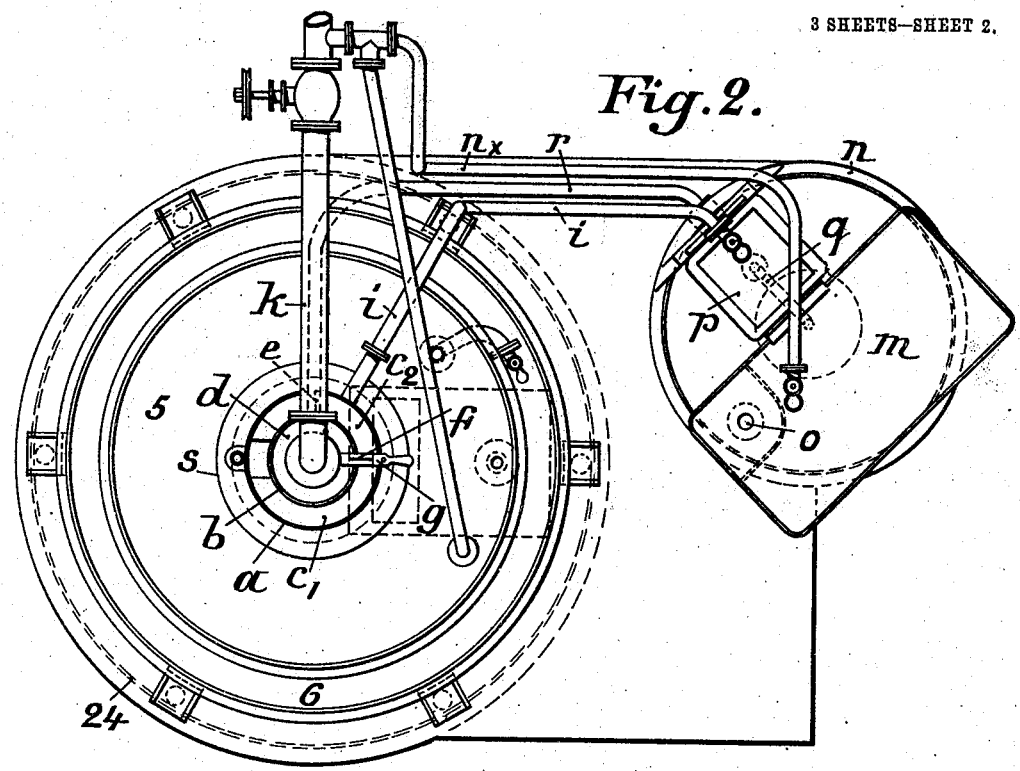
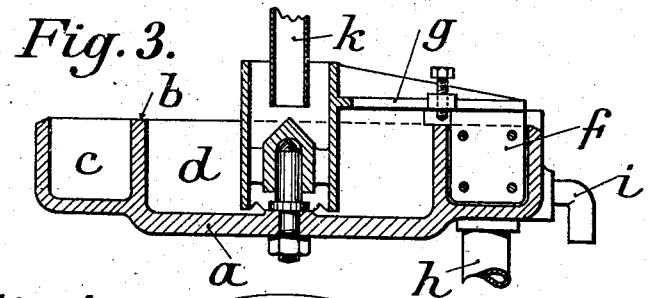
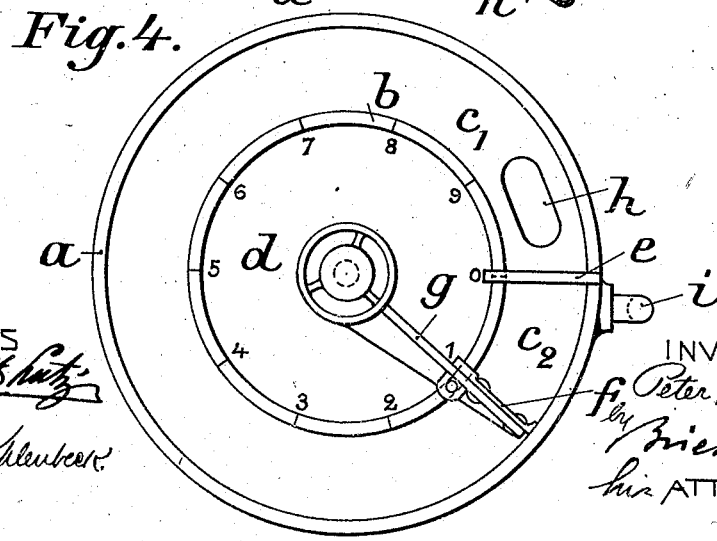

PETER BASTIAN, OF GREVENBROICH, GERMANY, ASSIGNOR TO MASCHINENFABRIK GREVENBROICH, OF GREVENBROICH, GERMANY.

WATER-PURIFIER.

No. 806,234.      Specification of Letters Patent.      Patented Dec. 5, 1905.

Application filed August 27, 1904. Serial No. 222,379.

*To all whom it may concern:*

Be it known that I, PETER BASTIAN, a subject of the German Emperor, residing at Grevenbroich, Germany, have invented certain new and useful Improvements in Water-Purifiers; and I do hereby declare the following to be a full, clear, and exact description of the invention, such as will enable others skilled in the art to which it appertains to make and use the same.

My invention relates to apparatus for purifying water or, more specifically, for "softening" "hard" water that is to be used as feed-water for boilers or other similar purposes.

More especially, the invention refers to that kind of water-purifiers in which the supply of chemical agents admitted to the raw feed-water is automatically regulated so as to correspond in quantity to all practical variations of the feed-water supply.

In principle my invention is based upon the fact that only a certain quantity of chemical agents is dissolved in a given quantity of water. Thus, for instance, if lime is employed as a precipitant it will be practically safe to assume that about one per cent. of lime is dissolved in any quantity of water. By dividing the total amount of feed-water supplied into two portions and saturating the one portion with lime and then reuniting both portions the exact quantity of lime required for precipitating the minerals contained in the raw water will be introduced into the feed-water. It will therefore only be necessary to provide means for portioning off a certain percentage of the total amount of feed-water and allowing this percentage to be saturated with lime, and this rule will hold good irrespective of the amount of raw feed-water supplied.

My invention therefore consists in providing means for dividing the feed-water supply according to a certain predetermined ratio, and thus I automatically obtain the desired result of apportioning the total amount of precipitant supplied to the water according to and irrespectively of any variations in the total quantity thereof.

My invention also comprises means for automatically dissolving and apportioning a second precipitant and other means for separating the resultant soft water from the precipitated mineral substances.

Of the accompanying drawings, Figure 1 is a vertical section of the apparatus. Fig. 2 is a plan view of the same. Fig. 3 is a vertical section of a detail; Fig. 4, a plan view of the same, and Fig. 5 a vertical section of another detail separately illustrated on a large scale. Fig. 6 is a detail plan view of a modification.

The same parts are indicated by the same symbols of reference in all the figures.

Referring to Figs. 1 to 4, $a$ is a small tank or vat divided by the circular partition $b$, having horizontal edge, into the outer ring-shaped portion $c$ and the inner cylindrical portion $d$. The outer portion $c$ is again divided by radial partitions $e$ and $f$ into separate chambers $c'$ and $c^2$. The partition $e$ is fixed, and the partition $f$ is connected to a rotatable spoke $g$ and can thereby be given any desired position round the circumference of the distributing-tank. On the edge of the partition $b$ I prefer to provide a scale upon which the exact position of the radial partition $f$ can be read, the spoke $g$ serving as an index therefor. If desired, another partition $f'$, connected to a rotatable spoke $g'$, may be provided to form an additional chamber $c^3$, with an outlet $i'$, as illustrated in Fig. 6. Above the center of the tank an inlet-pipe $k$ is placed, which is supposed to be connected to a feed-pump supplying raw feed-water. At the bottom of the tank $a$ at $h$ an orifice is provided for the discharge of a part of the water, and a second discharge-pipe is provided at $i$. In Fig. 1 it will be seen that the pipe $i$ discharges into a hopper $p$, from whence another pipe $q$ leads downward to the bottom of a mixing-tank $n$. At the top of this mixing-tank a vat $m$ is provided, into which the precipitant—for instance, lime—is periodically fed in such quantity that it will always suffice to treat the maximum of raw feed-water supplied. Just enough water to wash this precipitating agent down through pipe $o$ into the mixing-tank $n$ is supplied to the vat $m$ by means of the pipe $n^\times$. The mixing-tank $n$ is provided with a discharge-pipe $r$, by which it is connected to the precipitating-tank. This tank consists of a central vertical cylinder 23, provided at its upper end with a small mixing-vat 22 and open at its lower end. Outside this central cylinder a large number of conical guide-plates 25 are built up in a series one above the other. The lowest and the uppermost of these guide-plates are hermetically connected to the lower and upper end of the cylinder 23; but the upper or inner edges of the rest of the guide-plates 25 are given a somewhat larger diameter than the exterior of the central cylinder 23, so that between the inner edges and the exterior circumference of the cylinder 23 an annular opening is formed. It will be understood that the water admitted to the top of the cylinder 23 will fall to the bottom of the precipitating-tank and will thence pass round the outer or lower edge of the lowest guide-plate 25, and in rising up toward the discharge-pipe 32 portions of the water will pass inward between every pair of guide-plates. The interior diameters of the guide-plates 25, except the uppermost and lowermost, are made to increase from the lower toward the upper. At the bottom the precipitating vessel is provided with a port 31, closed by a plug and intended for the discharge of the precipitated solids. The uppermost guide-plate 30 is closely fitted to the cylinder 23, and therefore the water issuing from the annular channel 28 is forced to describe a sharp zigzag in order to reach the discharge-pipe 32. The object of this arrangement is to cause any solid substances that may still be suspended to be deposited. These substances will collect upon the partition 27, whence they can be periodically discharged downward to the bottom of the tank by means of the hand-operated valve 29. The orifice $h$ discharges into a heater $s$, which I prefer to use in most cases. The heater $s$ consists of a cylindrical vessel in which horizontal guide-plates $t$ are arranged in such a manner as to obstruct the direct passage of the water, which is thus forced to take a meandering passage on its way downward. At the bottom of the heater a steam-supply pipe $u$ is introduced.

In the example illustrated it is assumed that the raw water has to be treated with more than one chemical reagent in order to precipitate all the mineral substance it contains, and for this purpose I provide the mechanism illustrated in Fig. 5. In such cases, however, in which the whole quantity to be treated is large I find it advantageous to insert a second dividing-tank between the heater and the mixing or measuring apparatus, (illustrated in Fig. 5,) since the latter only requires a comparatively small quantity of water. I have therefore shown this second dividing-tank in Fig. 1, in which it will be seen that a bell 4 is attached to the upper end of the steam-pipe $u$. The tank 1 is placed below this bell and is provided with a discharge-pipe 3, leading to the mixing-vat 22, and a partition 2, by which part of the water overflowing into the tank is caused to be discharged through pipe $v$. The function of this part of the water is to actuate an apparatus for regulating the supply of a second precipitant in quantities corresponding to the variations of the supply of raw feed-water. This apparatus consists of the vessel $w$, which is rotatably mounted in bearings, so as to be capable of being rocked through a certain angle, preferably about sixty degrees. Two rubber cushions 14 are provided at both sides of and below the vessel $w$ in such positions that they prevent its being rocked beyond certain inclinations in both directions. The vessel $w$ consists of two separate buckets 12 and 13, and it will be understood by reference to Figs. 1 and 5 that in either of the two positions one of the two buckets 12 and 13 is presented to the discharge-pipe $v$. Moreover, the vessel $w$ is balanced in such a manner that it is rocked out of the position it has assumed every time the bucket presented to the discharge-pipe is filled. By this rocking motion the full bucket is discharged and the empty bucket is presented to the pipe $v$ and in its turn is filled. This arrangement constitutes a motor the speed of whose working is proportional to the quantity of water discharged into it through pipe $v$ in the unit of time. By means of a link 21 the bucket $w$ is connected to a two-armed lever $21^\times$, having a fixed pivot, and from the other arm of the said lever a small box 17 is suspended by a second link $21^{\times\times}$. The box 17 is composed of an outer part 18, to which the link $21^{\times\times}$ is attached, and a sliding inner part 19. The latter fits closely into the former, but not so closely that it cannot be easily moved. It will be seen that the inner sliding part 19 thus constitutes a piston and that the volume of the box can be varied according to requirements by giving this piston different positions. The piston or inner part 19 of the box 17 is provided with a port 20 and the outer part 18 with a nipple $20^\times$. The nipple $20^\times$ is connected, by means of a flexible tube 16, to a nipple 15, provided in the wall of the vessel 7 and leading into the tank containing the rocker $w$. This tank in its turn has an outlet $x$, leading into the mixing-vat 22, as shown in Fig. 1.

Above the tank 7 a tank 6 is provided having a discharge-pipe 8. This discharge-pipe contains and guides the spindle 10 of a valve 11, controlled by a float 9, immersed in tank 7. It will be understood that this float and valve will thus act to maintain the level of liquid in tank 7 at a constant height, because as soon as the level begins to sink the float 9 will also sink and will relieve the valve 11, thus allowing fresh liquid to run down through pipe 8.

The operation of the whole arrangement is best understood by reference to Fig. 1. It is assumed that two different precipitating agents are to be employed—such as, for instance, lime and caustic soda. The lime is introduced into the vat $m$, and sufficient water is admitted through pipe $n^\times$ to wash it down through pipe $o$ into the mixing-tank $n$. The other agent is mixed and dissolved in tank 5 and thence allowed to descend into tank 6. Tanks 6 and $n$ are the supply-tanks from which the precipitants are automatically taken by the apparatus, and tanks 5 and $m$ are merely arranged for the sake of convenience—that is, in order to provide suitable vessels for preparing the chemicals. It will be understood that this work can be done intermittently at convenient periods, and from these auxiliary tanks 5 and $m$ the supply-tanks proper—that is, tanks 6 and $n$—are replenished whenever their supply runs short. When the supply-tanks 6 and $n$ have been charged, nothing more is required than to admit the raw feed-water through pipe $k$ and if it is to be heated to admit steam through pipe $u$. All other functions of the apparatus are entirely automatic. The raw feed-water in entering the distributing-tank $a$ at $k$ rises in this tank until it overflows the horizontal edge $b$. Since this edge is divided into two parts by means of the movable partition $f$, a part of the water will enter chamber $c'$, and the rest will run into chamber $c^2$. The movable partition $f$ is adjusted according to the composition of the raw water. The water issuing at $i$ from the chamber $c^2$ is allowed to run into the hopper $p$ and thence through pipe $q$ to the bottom of tank $n$. Here a sufficient quantity of lime is collected, and this lime is stirred up by the water issuing from pipe $q$ and saturates this water as it gradually rises up in the tank until it overflows through pipe $r$, carrying with it the required quantity of lime in a dissolved state, and is reintroduced into the main bulk of water, simultaneously arriving at the mixing-vat 22. The main bulk of water issues at $h$ from the distributing-vat $a$ takes a zigzag route over the guide-plates $t$, where it comes into contact with the steam issuing from pipe $u$ and is heated accordingly. It drops to the bottom of the heater $s$, passes under the edge of the bell 4, and overflows into the second distributing-tank $y$, whence a larger portion descends directly through discharge-pipe 3 to the mixing-vat 22, while a part overflows into the chamber 2. This second distribution also takes place according to a certain ratio, depending upon the ratio of the lengths of the edges of the vessels 1 and 2. In principle the functions of the apparatus would not be altered if the whole bulk of water were allowed to flow through chamber 2; but in treating larger quantities of water such an arrangement would require making the rocking buckets $w$ considerably larger than convenient. From 2 the water descends through discharge-pipe $v$ into either of the buckets 12 or 13. The full bucket is discharged into the tank $w^{\times}$ and the empty bucket in turn presented to the discharge-pipe $v$. From $w^{\times}$ the water runs freely off through discharge-pipe $x$ into the mixing vessel 22. The lye-tank 7 is automatically kept filled with lye up to a certain constant level by means of the float 9, governing the valve 11. Every time the vessel $w$ is rocked into the position shown in dotted lines in Fig. 1 the box 17 is immersed in the lye by means of the lever $21^{\times}$ and the links 21 and $21^{\times\times}$, and by port 20 it fills up with lye. Every time the buckets swing back again into the position shown in full lines the box 17 is raised, as shown on Fig. 1, and the lye contained therein runs off through the flexible tube 16 into the vat $w^{\times}$, where it mixes with the raw water and issues through discharge-pipe $x$ into the mixing vessel 22. The lye contained in tank 7 has a certain concentration accordingly as it has been prepared, and it is therefore only necessary to ascertain the composition of the raw water by a previous analysis and to determine by calculation the volume of this lye that has to be added to every unit of raw water to insure complete precipitation of the minerals contained therein. The piston 19 in box 17 is set accordingly, and thus a constant and predetermined volume of lye will automatically be added to every unit of raw water arriving at 22, and this quite irrespective of the velocity with which the water is admitted, since the rocker $w$ will automatically regulate the supply of lye accordingly. It will be seen that at 22 all the different mixtures are reunited and now pass downward together in the central tube 23 of the precipitator. As this tube expands at the bottom the flow of the water therein will be proportionately arrested, and consequently the major part of the precipitate will be here deposited. Then as the water turns the lower edge of the lowest guide-plate 25 it is induced to pass slowly through the system of guide-plates into the central channel 28, which gradually widens toward the top. By this process it is once more thoroughly mixed, and any solids still contained in it are precipitated and deposited on the guide-plates, whence they slide down to the bottom of the precipitator and can be periodically discharged at 31. The water that issues at the top of the central channel 28 is again deflected downward by the uppermost guide-plate 30 and in rising up from its lower or outer edge deposits the last remainders of solid matter on the bottom 27, whence it can be periodically discharged through the hand-operated valve 29. Finally the purified water leaves the precipitator at 32.

I desire it to be understood that what has been specifically described is the preferred embodiment of my improved purifier; but all persons conversant with the art will readily understand that various modifications in detail of construction and arrangement might be introduced without changing the nature of the invention. It will also be understood that the number of movable partitions may be increased, as illustrated in Fig. 6, if desired.

Having now particularly described and ascertained the nature of my said invention and in what manner the same is to be performed, I declare that what I claim is—

1. In apparatus for purifying water, the combination with a circular vessel $d$ adapted to receive the raw water, of another vessel $c$ surrounding the said first vessel, the upper edge of the wall $b$ separating both vessels being horizontal, partitions $e\,f$ dividing the vessel $c$ into chambers, means for varying the relative distance of the partitions $e\,f$, separate discharge-orifices for each chamber, means for charging the portions of raw water issuing from said orifices with precipitating agents and means for reuniting the solutions thus obtained with the main bulk of raw water.

2. In apparatus for purifying water the combination with a circular vessel adapted to receive the raw water of a second vessel surrounding the aforesaid vessel, the upper edge of the circular partition common to both vessels being horizontal, of a fixed and a movable radial partition dividing the said second vessel into two separate chambers an index connected to the movable partition and a scale indicating the ratio of the lengths of the said horizontal edges leading from the first vessel to the said chambers, separate orifices for each chamber, one of said orifices discharging into a tank containing a supply of precipitant and the other discharging into a heater, means for separating a constant percentage of the water issuing from the heater, a vessel composed of two buckets and adapted to be rocked by the weight of said separated percentage of the water discharged into either of the said buckets, a vessel of adjustable volume adapted to be immersed in a lye-tank every time the said buckets are rocked, means for maintaining the level in said lye-tank constant, means for adding the lye contained in the adjustable vessel to the raw water, means for reuniting all the separate portions of water and of a precipitator consisting of a vertical cylinder and a series of conical guide-plates surrounding the same and forming ring-shaped openings of diameters increasing in the direction of the flow, the lowest and uppermost of said conical plates being fitted closely to said cylinder and of means for discharging the solids deposited at the bottom of said precipitator.

In witness whereof I have hereunto set my hand in presence of two witnesses.

PETER BASTIAN.

Witnesses:
HUGO SCHMITZ,
ALFRED HANNICKA.